2,909,427

PROCESS OF MAKING FERROCOLUMBIUM FROM COLUMBITE ORE

Heinrich W. Rathmann, John O. Staggers, and Henry K. Bruner, Cambridge, Ohio, assignors to Vanadium Corporation of America, New York, N.Y., a corporation of Delaware No Drawing. Application July 22, 1958
Serial No. 750,273

12 Claims. (Cl. 75—133.5)

This invention relates to a process of making ferrocolumbium from columbite ores containing oxides of columbium, tantalum and iron. These ores usually also contain oxides of tin and/or phosphorus.

An object of the invention is to produce from these ores, ferrocolumbium having a low content of tin and/or phosphorus (where the ore contains oxides of these elements) and a much higher ratio of columbium to tantalum than the ratio of these elements in the columbite ore.

Another object of the invention is the production of ferrocolumbium by a process giving a high recovery of columbium.

Another object of the invention is the production of ferrocolumbium by a process in which the basic lining of the furnace in which the process is carried out is not unduly attacked.

In the production of ferrocolumbium according to the prior art, difficulties have been encountered in substantially completely eliminating tin and phosphorus from the ferrocolumbium. Also, the production of ferrocolumbium having a much higher ratio of columbium to tantalum than that present in the ore has presented a problem. These features are of importance in the subsequent utilization of ferrocolumbium since the presence of tin and phosphorus in ferrocolumbium is deleterious for many purposes. Furthermore, it is desirable for many purposes, as, for instance, in the use of an alloy for treating stainless steel, to use an alloy containing a high ratio of columbium to tantalum since columbium is more efficient for this purpose than tantalum. It is, therefore, better to leave the valuable tantalum for other purposes. The practices described in the prior art lead to such losses of columbium in the slag as to impose a serious limitation upon the economic feasibility of this practice.

According to our invention, ferrocolumbium is produced by means of a two-step process, each step being carried out in a basic lined furnace. In the first step, the columbite ore or the columbite ore concentrate containing oxides of columbium, tantalum and iron, and usually containing also oxides of tin and phosphorus, is melted with lime and fluorspar over an iron bath. This step preferably is carried out in an electric furnace which may advantageously be lined with magnesite but should in any case have a basic lining. A limited amount of aluminum, carbon or other suitable reducing agent is then added to the slag, thus reducing the oxides of tin and phosphorus, as well as some of the iron and manganese oxides, from the slag and introducing these elements into the iron bath. The amount of the reducing agent used in this first step is sufficient to reduce substantially all of the oxides of tin and phosphorus and a major portion of the iron and introduce these elements into the iron bath while retaining in the slag substantially all of the columbium and tantalum values. When the desired reactions have gone substantially to completion, there are available a slag, referred to as a "first slag," and an iron bath. The slag contains substantially all of the columbium and tantalum values (oxides of columbium and tantalum) and is practically free from tin and phosphorus. The iron bath contains the major portion of the iron and substantial portions of manganese and other impurities originally contained in the ore.

Suitable reducing agents for use in the first step of our process are aluminum, carbon, silicon, ferrosilicon, calcium, calcium silicide, magnesium and magnesium-aluminum alloy.

It is customary in our practice to tap the entire contents of the furnace and to allow them to solidify. The slag and the iron are then separated and the slag is used in the second step of the process. This practice is, however, entirely discretionary and may well be substituted by one in which the slag is separated from the iron bath while the slag is in the liquid phase.

In the second step of our process, the first slag containing the oxides of columbium and tantalum is charged into a furnace, preferably an electric furnace provided with a basic lining which preferably is magnesite. If the solid slag is charged, it is usually crushed before charging. It is mixed with a reducing agent and usually with additional lime and fluorspar. The reducing agents suitable for use in this step of our process are aluminum or silicon. The mixture also preferably contains mill scale. Although the addition of mill scale is not necessary, it is preferable since, upon reduction, it adds iron to the ferrocolumbium. It reacts with the reducing agent exothermically to provide additional heat for carrying out the second step and the iron resulting from its reduction flushes out columbium and tantalum from the slag and drives them into the bath of ferrocolumbium. If the slag is charged in the molten condition, the same reagents are added but it is preferred to add the mill scale first to the furnace, followed later by the lime, fluorspar and reducing agent, as this permits better control of the reducing operation. The amount of reducing agent added in this step can be varied to produce ferrocolumbium containing columbium and tantalum in different desired ratios. The amount of reducing agent added is preferably between 60 and 110% of the amount required for the reduction of all of the columbium, tantalum, and iron oxides contained in the slag. As the amount of reducing agent used in the second step increases, the ratio of columbium to tantalum in the ferrocolumbium decreases. This second step results in a bath of ferrocolumbium and a second slag. The ferrocolumbium is then separated from the second slag.

In our process, fluorspar usually is used together with lime in order to improve the fluidity of the slag. In carrying out our invention, the amount of lime used in the first step is from 40 to 80% by weight of the total lime used in both the first and second steps. If fluorspar is used in either or both steps, it is calculated as lime on the basis that 1.39 pounds of $CaF_2$ is equivalent to 1 pound of CaO. In other words, according to our invention, we use in the first step only a portion of the total lime or total lime and fluorspar, as the case may be, which is used in both the first and second steps. If a smaller amount of lime than 40% is used in the first step, there will be an excessive attack on the magnesite lining of the furnace. If a larger amount than 80% of lime is employed, it is frequently difficult to reduce phosphorus and tin to the desired low levels.

We have discovered that a careful control of the slag composition in each of Steps 1 and 2 of the process results in a more thorough removal of the deleterious elements, tin and phosphorus, in the first step and in a higher ratio of columbium to tantalum in the ferrocolumbium obtained in the second step while at the same time maintaining a good yield of columbium in the second step and without causing undue damage to the refractory lining of the furnace in either the first or second step.

In carrying out either Step 1 or Step 2, it is evident, of course, that if aluminum is used as the reducing agent, it is converted into aluminum oxide ($Al_2O_3$). In carrying out our process, it is preferred that the total of the lime used in both the first and second steps, the total of the fluorspar used in both the first and second steps, when calculated as lime, and the total of the aluminum used in both said first and second steps (whether or not aluminum is used in said first step), when converted to $Al_2O_3$, be in such proportions that together with any alumina which may be otherwise introduced into the slag, result in a slag having the approximate proportions of $5CaO.3Al_2O_3$. If silicon is used as the reducing agent, it is converted into silica. In this case, it is preferred that the lime, fluorspar, if used, and silicon reducing agent be in such proportions as to form a slag in the second step of the process having the approximate composition of $2CaO.SiO_2$. Slag containing CaO and $Al_2O_3$ in the mol ratio of 5:3 and slag containing CaO and $SiO_2$ in the mol ratio of 2:1 are approximately neutral.

We have found that by limiting the amount of lime used in the first step to 40 to 80% of the total lime used in both the first and second steps of the process, the ratio of columbium to tantalum in the ferrocolumbium is substantially increased.

When economically feasible, the residual slag resulting from the second step of the process can be treated with a further amount of reducing agent, particularly aluminum, to recover the columbium and tantalum values contained therein.

The following examples further illustrate our process.

EXAMPLE 1

*Step 1*

An ore-lime mix was prepared by mixing together in a rotary mixer:

|   | Lbs. |
|---|---|
| Columbite ore concentrate | 7500 |
| Pebble lime | 1900 |
| Fluorspar | 1100 |

The columbite ore concentrate analyzed as follows:

COLUMBITE ORE CONCENTRATE

|   | Percent |
|---|---|
| $Cb_2O_5$ | 63.8 |
| $Ta_2O_5$ | 8.1 |
| Ratio Cb/Ta | 6.73 |
| FeO | 18.58 |
| $SnO_2$ | 1.98 |
| $P_2O_5$ | 0.13 |
| MnO | 1.93 |
| $TiO_2$ | 2.40 |
| $ZrO_2$ | 0.36 |
| $WO_3$ | 0.64 |

5,000 pounds of steel scrap were charged into an electric furnace and melted down in about 60 minutes under cover of a small amount of the ore-lime mix. The balance of the ore-lime mix was then charged over a period of 120 minutes while power was maintained at between 1800 and 2000 kw. load. Aluminum additions totaling 550 pounds followed over a period of about 20 minutes. Samples were taken throughout the operation to observe the progress of the heat. After a 5-minute superheat period to complete the reaction, the slag (first slag) was carefully decanted into a mold. The molten bath of ferrous alloy was retained in the furnace and additional batches of mixtures of columbite concentrate, lime, fluorspar and aluminum similar to that just described were added to the ferrous alloy bath and treated in a similar manner. A total of 14 batches of the mixtures was treated and the resulting slags which amounted to 134,879 pounds were combined. The overall analysis of this slag (first slag) was as follows:

Slag:

|   | Percent |
|---|---|
| Combined oxides [1] | 49.15 |
| CaO | 23.09 |
| MgO | 10.99 |
| $Al_2O_3$ | 7.70 |
| $SnO_2$ | 0.031 |
| FeO | 3.82 |
| $P_2O_5$ | 0.037 |

[1] Combined oxides are the oxides of Cb, Ta, Zr, Ti and W.

The combined oxides in the slag were in approximately the same relative proportions as in the columbite ore concentrate. The columbium oxide and tantalum oxide amounted to over 95% of the combined oxides. Recovery of columbium and tantalum (in the form of their oxides) in this step was about 90%.

The combined weight of the ferrous alloy produced in carrying out Step 1 in 14 heats was 48,653 pounds and analyzed as follows:

METAL PRODUCED IN STEP 1

|   | Percent |
|---|---|
| Sn | 2.34 |
| P | 0.060 |
| Cb+Ta+Zr+Ti | 3.30 |
| Fe | Balance |

The slag (first slag) produced in these 14 heats was stored and used in a number of subsequent runs as required. One of these runs is described below.

*Step 2*

The slag was mechanically mixed with other reagents in a rotary mixer to produce the following mixture:

|   | Lbs. |
|---|---|
| Slag | 14,500 |
| Iron scale | 1,162 |
| Grained aluminum (99% Al) | 2,807 |
| Pebble lime | 1,123 |
| Ground fluorspar | 618 |

The amount of aluminum in this mixture is that required to react stoichiometrically with all of the oxides of columbium, tantalum, iron and other elements present in the mixture. This mixture contains sufficient lime and fluorspar to form the compound $5CaO.3Al_2O_3$ with the $Al_2O_3$ resulting from the oxidation of Al in Step 2 and with the CaO and $Al_2O_3$ contained in the first slag used in making the mixture for Step 2.

200 pounds of steel punchings were placed in the bottom of a magnesite lined 2,000 kva. furnace and an arc was struck. The mixture was fed slowly into the furnace until an operating load had been established, after which the mix was charged at the rate of 90 to 100 pounds per minute so that charging was completed in just under 3½ hours, the reaction proceeding all the while. An additional period of 20 minutes was allowed for superheating to complete the reaction and to clear the slag. The major portion of the slag (second slag) was then decanted and the remainder was cast, together with the ferrocolumbium, into a cast iron mold which had been provided with a light layer of magnesite. The ferrocolumbium thus produced weighed 6260 pounds and analyzed as follows:

FERROCOLUMBIUM ALLOY

|   | Percent |
|---|---|
| Cb | 66.2 |
| Ta | 4.9 |
| Ratio Cb/Ta | 13.51 |
| Sn | 0.022 |
| P | 0.032 |
| Al | 0.22 |
| Si | 1.00 |
| Mn | 2.32 |
| S | 0.004 |
| Fe | Balance |

The slag obtained from Step 2 (second slag) weighed 14,755 pounds and contained 4.60% of combined oxides of columbium and tantalum. The ratio of columbium to tantalum in the slag was about 3:1.

In Step 2, the recovery of columbium was 95.2%, the recovery of tantalum was 64.3% and the recovery of iron was 81.9%. The overall recovery of columbium in Steps 1 and 2 was 85%.

The effect of using different amounts of flux (lime plus fluorspar) in the first step is well illustrated by two series of heats shown in Tables 1 and 2 in which all factors were kept as constant as possible except as to the amount of flux used in Step 1 and except for the amount of aluminum reducer used in Step 2. In each series of tests, lime, fluorspar and aluminum were used in each of Steps 1 and 2. In the series of tests shown in Table 1, the amounts of lime and fluorspar added in the first step were sufficient to form $5CaO.3Al_2O_3$ with all the aluminum used in the first and second steps. In the series of tests shown in Table 2, the amounts of lime and fluorspar added in the first step were 60% of this amount. In each series of tests, after the removal of the tin and phosphorus in the first step, the slag resulting from the first step was processed for the production of ferrocolumbium according to the second step of our process, using, in the different tests of each series, 70%, 80%, 90%, 100% or 110% of the theoretical amount of aluminum required to reduce all of the oxides in the slag. The results of the two series of tests are tabulated below:

*Table 1*

FERROCOLUMBIUM USING FULL AMOUNT OF LIME-SPAR FLUX IN STEP 1

| Heat No. | Percent Al Used | Cb | Ta | Cb/Ta | Ti | Sn | P |
|---|---|---|---|---|---|---|---|
| 1 | 110 | 57.6 | 8.6 | 6.70 | 0.66 | .014 | .009 |
| 2 | 100 | 59.1 | 7.7 | 7.68 | 0.36 | .017 | .009 |
| 3 | 90 | 59.4 | 6.8 | 8.74 | 0.15 | .040 | .016 |
| 4 | 80 | 56.0 | 1.99 | 28.0 | 0.09 | .034 | .011 |
| 5 | 70 | 54.5 | 1.41 | 38.9 | 0.06 | .019 | .009 |

*Table 2*

FERROCOLUMBIUM USING LIMITED AMOUNT OF LIME-SPAR FLUX IN STEP 1

| Heat No. | Percent Al Used | Cb | Ta | Cb/Ta | Ti | Sn | P |
|---|---|---|---|---|---|---|---|
| 6 | 110 | 60.0 | 7.9 | 7.59 | 0.67 | .044 | .009 |
| 7 | 100 | 64.0 | 6.0 | 10.7 | 0.31 | .034 | .007 |
| 8 | 90 | 61.5 | 3.7 | 16.6 | 0.07 | .043 | .009 |
| 9 | 80 | 59.1 | 1.5 | 39.4 | 0.03 | .028 | .007 |
| 10 | 70 | 58.0 | 0.81 | 71.6 | 0.03 | .027 | .012 |

Comparison of Tables 1 and 2 shows clearly that the use of a limited amount of lime and fluorspar in the first step tends to exercise a limiting effect upon the reduction of tantalum oxide in the second step, i.e., tends to produce ferrocolumbium having a higher ratio of columbium to tantalum. Additionally, the columbium content of the ferrocolumbium was higher where the lime was kept at a low level in the first step of the process. Furthermore, the limited or lesser amount of lime used in the first step appears to prevent to a certain extent the introduction of titanium into the ferrocolumbium. The tin and phosphorus contents in the ferrocolumbium in the series of tests shown in Table 2, although low, were not as low as in some other runs. The tin in the ferrocolumbium generally averages about 0.02 to 0.03% when the amount of lime added in the first step is limited as described.

Silicon or silicon containing reducing agents as, for example, ferrosilicon, can be used as reducing agents in carrying out our process but it should be borne in mind that silicon has a tendency to stay in the ultimate ferrocolumbium product. Where such a silicon content can be tolerated, it is possible to use silicious reducing agents. The following example illustrates the use of silicon as a reducing agent in our process.

EXAMPLE 2

150 pounds of columbite ore concentrate referred to in Example 1 were mixed with 106 pounds of lime and 41 pounds of fluorspar and melted down over a bath of 100 pounds of steel scrap. To the slag were added 4 pounds of ferrosilicon containing 50% silicon. After completion of the reaction which resulted in 300 pounds of slag, the slag was separated from the iron bath. This slag was then melted down in a basic electric furnace and 57 pounds of lime and 45 pounds of silicon metal fines (97% Si) were added and heating continued.

The ferrocolumbium alloy was separated from the slag and had the following composition:

FERROCOLUMBIUM ALLOY

| | Percent |
|---|---|
| Cb | 49.4 |
| Ta | 1.6 |
| Ti | 0.16 |
| Sn | 0.55 |
| Si | 11.52 |
| Mn | 1.85 |
| Al | 0.12 |
| C | 0.12 |
| W | 0.48 |
| Fe | 33.62 |

In addition to the examples given above, we have used carbon as a reducing agent in the first step of our process to effect reduction of impurities contained in the columbite concentrate, particularly of tin and phosphorus. In one test, practicing the first step of the process, 37 pounds of columbite concentrate similar to that referred to in Example 1 were mixed with 18 pounds of lime and 10 pounds of fluorspar and charged to molten cast iron, the cast iron amounting to 20 pounds and containing about 4.5% carbon. In another case, 150 pounds of columbite concentrate similar to that given in connection with Example 1 were mixed with 106 pounds of lime, 41 pounds of fluorspar and 58 pounds of aluminum shot, the mixture was charged to a similar molten cast iron amounting to 100 pounds and the mixture was melted. In both cases, a slag was obtained which was satisfactory for use in the second step of our process. However, the substantial foaming of the slag during the first step cut down on the furnace capacity.

Calcium can be used as a reducing agent in carrying out the first step of our process, the calcium being in the form of calcium metal, calcium silicide or other similar calcium-containing alloy. When the calcium-containing reducing agent is added to the columbite-lime mix and the mixture is melted, the objectionable constituents of tin and phosphorus are reduced and the iron content lowered. The lime resulting from the reaction goes into the slag and is allowed for in calculating additions performed in the second step of the operation.

The outstanding advantage of our method of operating with a limited amount of lime in the first step, no matter what reducing agent is used in that step, is that the loss of columbium in the slag resulting from the second step is always smaller for any desired columbium to tantalum ratio in the ferrocolumbium. This effect is related to the fact that a higher columbium to tantalum ratio is obtained for a given amount of aluminum or silicon used in the second step.

The invention is not limited to the preferred embodiment but may be otherwise embodied or practiced within the scope of the following claims.

We claim:

1. The process of making ferrocolumbium from columbite ore containing oxides of columbium, tantalum and iron, which comprises melting in a first step in a basic lined furnace, a mixture of said ore, lime and a reducing agent, thereby forming a first slag and an iron bath, said reducing agent being in an amount sufficient to reduce a major portion of the oxide of iron while retaining in said first slag substantially all of the columbium and tantalum values, separating said first slag from the iron bath, melting in a second step in a basic lined furnace a mixture of said first slag, lime and a reducing agent selected from the class consisting of aluminum and silicon to reduce oxides of columbium, tantalum and iron from said first slag and form a bath of ferro-columbium and a second slag, and separating said ferrocolumbium from said second slag, the amount of lime used in said first step being from 40 to 80% by weight of the total lime used in both said first and said second steps.

2. The process of making ferrocolumbium from columbite ore containing oxides of columbium, tantalum and iron, which comprises melting in a first step in a basic lined furnace, a mixture of said ore, lime, fluorspar and a reducing agent, thereby forming a first slag and an iron bath, said reducing agent being in an amount sufficient to reduce a major portion of the oxide of iron while retaining in said first slag substantially all of the columbium and tantalum values, separating said first slag from the iron bath, melting in a second step in a basic lined furnace a mixture of said first slag, lime, fluorspar and a reducing agent selected from the class consisting of aluminum and silcon to reduce oxides of columbium, tantalum and iron from said first slag and from a bath of ferrocolumbium and a second slag, and separating said ferro-columbium from said second slag, the amounts of lime and fluorspar used in said first step, when the fluorspar is calculated as lime, being from 40 to 80% by weight of the total lime and fluorspar used in both said first and said second steps.

3. The process of making ferrocolumbium from columbite ore containing oxides of columbium, tantalum and iron, which comprises melting in a first step in a basic lined furnace, a mixture of said ore, lime and a reducing agent, thereby forming a first slag and an iron bath, said reducing agent being in an amount sufficient to reduce a major portion of the oxide of iron while retaining in said first slag substantially all of the columbium and tantalum values, separating said first slag from the iron bath, melting in a second step in a basic lined furnace a mixture of said first slag, lime and a reducing agent selected from the class consisting of aluminum and silicon to reduce oxides of columbium, tantalum and iron from said first slag and form a bath of ferrocolumbium and a second slag, and separating said ferrocolumbium from said second slag, the amount of lime used in said first step being from 40 to 80% by weight of the total lime used in both said first and said second steps, the total lime used in said first and second steps being in such proportion to the acid oxide formed by the reducing agent in said first and second steps that said second slag is approximately neutral.

4. The process of making ferrocolumbium from columbite ore containing oxides of columbium, tantalum and iron, which comprises melting in a first step in a basic lined furnace, a mixture of said ore, lime, fluorspar and a reducing agent, thereby forming a first slag and an iron bath, said reducing agent being in an amount sufficient to reduce a major portion of the oxide of iron while retaining in said first slag substantially all of the columbium and tantalum values, separating said first slag from the iron bath, melting in a second step in a basic lined furnace a mixture of said first slag, lime, fluorspar and a reducing agent selected from the class consisting of aluminum and silicon to reduce oxides of columbium, tantalum and iron from said first slag and from a bath of ferrocolumbium and a second slag, and separating said ferrocolumbium from said second slag, the amounts of lime and fluorspar used in said first step, when the fluorspar is calculated as lime, being from 40 to 80% by weight of the total lime and fluorspar used in both said first and said second steps, when the fluorspar is calculated as lime, being in such proportions to the total oxide formed by the reducing agent in said first and second steps that said second slag is substantially neutral.

5. The process of making ferrocolumbium from columbite ore containing oxides of columbium, tantalum and iron, which comprises melting in a first step in a basic lined furnace, a mixture of said ore, lime and aluminum, thereby forming a first slag and an iron bath, said aluminum being in an amount sufficient to reduce a major portion of the oxide of iron while retaining in said first slag substantially all of the columbium and tantalum values, separating said first slag from the iron bath, melting in a second step in a basic lined furnace a mixture of said first slag, lime and aluminum to reduce oxides of columbium, tantalum and iron from said first slag and form a bath of ferrocolumbium and a second slag, and separating said ferrocolumbium from said second slag, the amount of lime used in said first step being from 40 to 80% by weight of the total lime used in both said first and second steps, the total lime used in said first and second steps being in such proportion to the total alumina formed in said first and second steps that said second slag approximates the composition $5CaO.3Al_2O_3$.

6. The process of making ferrocolumbium from columbite ore containing oxides of columbium, tantalum and iron, which comprises melting in a first step in a basic lined furnace, a mixture of said ore, lime, fluorspar and a reducing agent, thereby forming a first slag and an iron bath, said reducing agent being in an amount sufficient to reduce a major portion of the oxide of iron while retaining in said first slag substantially all of the columbium and tantalum values, separating said first slag from the iron bath, melting in a second step in a basic lined furnace a mixture of said first slag, lime, fluorspar and aluminum to reduce oxides of columbium, tantalum and iron from said first slag and form a bath of ferrocolumbium and a second slag, and separating said ferrocolumbium from said second slag, the amounts of lime and fluorspar used in said first step, when the fluorspar is calculated as lime, being from 40 to 80% by weight of the total lime and fluorspar used in both said first and said second steps, the total lime and fluorspar used in said first and second steps, when the fluorspar is calculated as lime, being in such proportions to the total alumina formed in said first and second steps that said second slag approximates the composition $5CaO.3Al_2O_3$.

7. The process of making ferrocolumbium from columbite ore containing oxides of columbium, tantalum and iron, which comprises melting in a first step in a basic lined furnace, a mixture of said ore, lime and silicon, thereby forming a first slag and an iron bath, said silicon being in an amount sufficient to reduce a major portion of the oxide of iron while retaining in said first slag substantially all of the columbium and tantalum values, separating said first slag from the iron bath, melting in a second step in a basic lined furnace a mixture of said first slag, lime and silicon to reduce oxides of columbium, tantalum and iron from said first slag and form a bath of ferrocolumbium and a second slag, and separating said ferrocolumbium from said second slag, the amount of lime used in said first step being from 40 to 80% by weight of the total lime used in both said first and said second steps, the total lime used in said first and second steps being in such proportion to the total silica formed in said first and second steps that said second slag approximates the composition $2CaO.SiO_2$.

8. The process of making ferrocolumbium from columbite ore containing oxides of columbium, tantalum and iron, which comprises melting in a first step in a basic lined furnace, a mixture of said ore, lime, fluorspar and silicon, thereby forming a first slag and an iron bath, said silicon being in an amount sufficient to reduce a major portion of the oxide of iron while retaining in said first slag substantially all of the columbium and tantalum values, separating said first slag from the iron bath, melting in a second step in a basic lined furnace a mixture of said first slag, lime, fluorspar and silicon to reduce oxides of columbium, tantalum and iron from said first slag and form a bath of ferrocolumbium and a second slag, and separating said ferrocolumbium from said second slag, the amounts of lime and fluorspar used in said first step, when the fluorspar is calculated as lime, being from 40 to 80% by weight of the total lime and fluorspar used in both said first and said second steps, the total lime and fluorspar used in said first and second steps, when the fluorspar is calculated as lime, being in such proportions to the total silica formed in said first and second steps that said second slag approximates the composition 2CaO.SiO$_2$.

9. The process of making ferrocolumbium from columbite ore containing oxides of columbium, tantalum, iron, tin and phosphorus, which comprises melting in a first step in a basic lined furnace, a mixture of said ore, lime and a reducing agent, thereby forming a first slag and an iron bath, said reducing agent being in an amount sufficient to reduce substantially all of the oxides of tin and phosphorus and a major portion of the iron oxide while retaining in said first slag substantially all of the columbium and tantalum values, separating said first slag from the iron bath, melting in a second step in a basic lined furnace a mixture of said first slag, lime and a reducing agent selected from the class consisting of aluminum and silicon to reduce oxides of columbium, tantalum and iron from said first slag and form a bath of ferrocolumbium and a second slag, and separating said ferrocolumbium from said second slag, the amount of lime used in said first step being from 40 to 80% by weight of the total lime used in both said first and said second steps.

10. The process of making ferrocolumbium from columbite ore containing oxides of columbium, tantalum, iron, tin and phosphorus, which comprises melting in a first step in a basic lined furnace a mixture of said ore, lime and a reducing agent selected from the class consisting of aluminum, carbon and silicon, thereby forming a first slag and an iron bath, said reducing agent being in an amount sufficient to reduce substantially all of the oxides of tin and phosphorus and a major portion of the iron oxide while retaining in said first slag substantially all of the columbium and tantalum values, separating said first slag from the iron bath, melting in a second step in a basic lined furnace a mixture of said first slag, lime and a reducing agent selected from the class consisting of aluminum and silicon to reduce oxides of columbium, tantalum and iron from said first slag and form a bath of ferrocolumbium and a second slag, and separating said ferrocolumbium from said second slag, the amount of lime used in said first step being from 40 to 80% by weight of the total lime used in both said first and said second steps.

11. The process of making ferrocolumbium from columbite ore containing oxides of columbium, tantalum, iron, tin and phosphorus, which comprises melting in a first step in a basic lined furnace a mixture of said ore, lime, fluorspar and aluminum, thereby forming a first slag and an iron bath, said aluminum being in an amount sufficient to reduce substantially all of the oxides of tin and phosphorus and a major portion of the iron oxide while retaining in said first slag substantially all of the columbium and tantalum values, separating said first slag from the iron bath, melting in a second step in a basic lined furnace a mixture of said first slag, lime, fluorspar and aluminum to reduce oxides of columbium, tantalum and iron from said first slag and form a bath of ferrocolumbium and a second slag, the amounts of lime and fluorspar used in said first step, when the fluorspar is calculated as lime, being from 40 to 80% by weight of the total lime and fluorspar, when the fluorspar is calculated as lime, used in both said first and said second steps.

12. The process of making ferrocolumbium from columbite ore containing oxides of columbium, tantalum, iron, tin and phosphorus, which comprises melting in a first step in a basic lined furnace and in contact with an iron bath, a mixture of said ore, lime, fluorspar and aluminum, thereby forming a first slag, said aluminum being in an amount sufficient to reduce substantially all of the oxides of tin and phosphorus and a major portion of the iron oxide, and introduce these elements into the iron bath while retaining in said first slag substantially all of the columbium and tantalum values, separating said first slag from the iron bath, melting in a second step in a basic lined furnace a mixture of said first slag, lime, fluorspar and aluminum, the aluminum being in an amount between 60 and 110% of that required for the reduction of all of the oxides of columbium, tantalum and iron in said first slag, and separating said ferrocolumbium from said second slag, the amounts of lime and fluorspar used in said first step, when the fluorspar is calculated as lime, being from 40 to 80% by weight of the total lime and fluorspar, when the fluorspar is calculated as lime, used in both said first and said second steps.

References Cited in the file of this patent

UNITED STATES PATENTS

| | | |
|---|---|---|
| 2,131,350 | Leemans | Sept. 27, 1938 |
| 2,140,800 | Leemans | Dec. 20, 1938 |
| 2,140,801 | Leemans | Dec. 20, 1938 |
| 2,164,279 | Leemans | June 27, 1939 |

FOREIGN PATENTS

| | | |
|---|---|---|
| 332,799 | Italy | Dec. 9, 1935 |

UNITED STATES PATENT OFFICE

CERTIFICATE OF CORRECTION

Patent No. 2,909,427                                                    October 20, 1959

Heinrich W. Rathmann et al

It is hereby certified that error appears in the printed specification of the above numbered patent requiring correction and that the said Letters Patent should read as corrected below.

Column 7, line 75, after "said second steps," insert -- the total lime and fluorspar used in said first and second steps, --.

Signed and sealed this 22nd day of March 1960.

(SEAL)
Attest:

KARL H. AXLINE                                                       ROBERT C. WATSON
Attesting Officer                                                   Commissioner of Patents